United States Patent
Feucht et al.

(10) Patent No.: US 8,008,909 B2
(45) Date of Patent: Aug. 30, 2011

(54) ANALYSIS AND COMPENSATION CIRCUIT FOR AN INDUCTIVE DISPLACEMENT SENSOR

(75) Inventors: Thomas Feucht, Wimsheim (DE); Wolfgang Gscheidle, Oberstenfeld (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 458 days.

(21) Appl. No.: 12/159,573

(22) PCT Filed: Dec. 22, 2006

(86) PCT No.: PCT/EP2006/012439
§ 371 (c)(1), (2), (4) Date: Oct. 28, 2008

(87) PCT Pub. No.: WO2007/079955
PCT Pub. Date: Jul. 19, 2007

(65) Prior Publication Data
US 2009/0302868 A1    Dec. 10, 2009

(30) Foreign Application Priority Data
Dec. 29, 2005   (DE) .......................... 10 2005 062 906

(51) Int. Cl.
*G01R 33/00* (2006.01)
(52) U.S. Cl. ............................... 324/207.12; 324/207.15
(58) Field of Classification Search .................. None
See application file for complete search history.

(56) References Cited

U.S. PATENT DOCUMENTS

| | | | |
|---|---|---|---|
| 4,300,647 A * | 11/1981 | Knothe et al. | ................ 177/212 |
| 4,942,372 A | 7/1990 | Heimlicher | |
| 5,072,180 A | 12/1991 | Moreau | |
| 6,456,063 B1 * | 9/2002 | Moreno et al. | ........... 324/207.12 |
| 6,541,961 B1 * | 4/2003 | Max | ......................... 324/207.16 |
| 7,173,411 B1 * | 2/2007 | Pond | ........................ 324/207.12 |
| 7,492,148 B2 * | 2/2009 | Miller | ....................... 324/207.15 |
| 2004/0150412 A1 | 8/2004 | Hayashi et al. | |
| 2007/0222461 A1 | 9/2007 | Miller | |

FOREIGN PATENT DOCUMENTS

| | | |
|---|---|---|
| DE | 69027816 T2 | 2/1997 |
| DE | 199 08 360 A1 | 6/2000 |
| DE | 101 41 764 A1 | 6/2002 |
| DE | 103 48 343 B3 | 2/2005 |
| DE | 10341485 A1 | 4/2005 |
| EP | 0319470 A1 | 6/1989 |
| EP | 1 512 937 A2 | 3/2005 |

OTHER PUBLICATIONS

International Search Report dated Aug. 3, 2007 w/English translation (four (4) pages).

* cited by examiner

*Primary Examiner* — Paresh Patel
(74) *Attorney, Agent, or Firm* — Crowell & Moring LLP

(57) ABSTRACT

A circuit arrangement for analysis and compensation of the signals for an inductive displacement sensor is provided. The circuit includes a first operating amplifier, a second operating amplifier and a coil for a displacement measurement, in parallel with the second operating amplifier output and the second operating amplifier first input and connected to a capacitance in series with the coil inductance and coil resistance to form an RLC series tuned circuit. In order to improve the accuracy of a measured resonance frequency, the circuit arrangement can be extended with a second coil for a temperature compensation, by connecting a first of the ends of the coil winding to a second end of the coil winding of the first coil and a second of the ends of the coil winding to the second input of the first operating amplifier.

19 Claims, 2 Drawing Sheets

Illustrated switch position, frequency measurement (position)

ANALYSIS AND COMPENSATION CIRCUIT FOR AN INDUCTIVE DISPLACEMENT SENSOR

CROSS-REFERENCE TO RELATED APPLICATIONS

This application is a U.S. National Phase of PCT International Application No. PCT/EP2006/012439, filed on Dec. 22, 2006, which claims priority under 35 U.S.C. §119 to German Application No. 10 2005 062 906.7, filed Dec. 29, 2005, the entire disclosures of which are expressly incorporated by reference herein.

BACKGROUND AND SUMMARY OF THE INVENTION

The invention relates to a circuit arrangement for evaluation and compensation of the signals from an inductive position sensor, for example as is used in vehicle braking systems.

Pneumatic cylinders are frequently provided in braking systems such as these, with pistons whose piston position can be detected without contact being made, over a wide operating temperature range, generally from −40° C. to +150° C., in all operating states, for example in the presence of oil mist.

In known solutions which are used for these purposes, a plunger-type coil is generally used as a sensor coil, whose coil former has a hole on the longitudinal axis, which a metallic armature composed of ferromagnetic or non-ferromagnetic material enters, therefore varying the inductance of the plunger-type coil. This inductance change can be detected by an electronic evaluation circuit and can be supplied, in the form of a frequency or analog signal, to a microcontroller for further evaluation.

Various types of measurement principles are known for this purpose, and are in general based on measurement of the time constants $\tau=L/R$ of the coil. However, it is complex to measure the coil internal resistance, because of the low resistance of the plunger-type coil. Furthermore, if the measurement is carried out as a DC voltage measurement, this results in disadvantages in terms of susceptibility to external magnetic alternating fields and DC voltage shifts within the circuit arrangement that is used, for example as a result of an input voltage shift in an operational amplifier, which result in the position measurement not being sufficiently accurate.

However, an electrical signal which is as accurate as possible must be produced for measurement of the coil internal resistance of the plunger-type coil, providing a good simulation of the instantaneous piston position. At the same time, the output signal from the inductive position sensor or the plunger-type coil must have dynamics which are as good as possible, in order to allow the longitudinal movement of the sensor to be detected with specific sensitivity when position changes occur, and to be insensitive to the external magnetic alternating fields mentioned above, such as those produced by adjacent solenoid valves in the braking system, or by railway lines, scrap processing installations or steel induction furnaces in the vicinity.

The invention is therefore based on the object of providing a circuit arrangement for evaluation and compensation of signals from an inductive position sensor, which is insensitive to external magnetic alternating fields and produces an electrical signal with better accuracy and good dynamics.

According to the invention, this object is achieved by the features of patent claim 1, and alternatively by the features of patent claim 2.

Advantageous developments of the invention are the subject matter of the attached dependent claims.

The object of the invention is therefore solved by a circuit arrangement for evaluation and compensation of the signals from an inductive position sensor, characterized by:

a first operational amplifier to whose inputs a reference voltage is supplied;

a second operational amplifier to a first of whose inputs the output signal from the first operational amplifier is supplied and to a second of whose inputs a feed-back signal is supplied for closed-loop amplitude control; and a coil having a coil inductance and a coil resistance for position measurement, which coil is connected in parallel with the output of the second operational amplifier and the first input of the second operational amplifier and, in conjunction with a capacitance, which is connected in series with the coil inductance and the coil resistance, forms an RLC series resonant circuit.

This in its own right results in the RLC series resonant circuit having a resonant frequency of high accuracy and with good dynamics, and which is insensitive to external magnetic alternating fields. If this resonant frequency still includes inaccuracies which are intolerable (for example induction changes caused by changes in the permeability $\mu_r$ of the material over the temperature in the magnetic circuit), by an alternative circuit arrangement for evaluation and compensation of the signals from an inductive position sensor the accuracy of the resonant frequency can be further increased.

The alternative circuit arrangement for evaluation and compensation of the signals from an inductive position sensor is characterized by:

a first operational amplifier to a first of whose inputs a first reference voltage is supplied for a frequency measurement or a second reference voltage is supplied for a compensation measurement, and to a second of whose inputs the output signal from the first operational amplifier or a compensation signal is supplied;

a second operational amplifier, to a first of whose inputs the output signal from the first operational amplifier is supplied and to a second of whose inputs a feed-back signal is supplied for closed-loop amplitude control;

a first coil having a first coil inductance and a first coil resistance for a position measurement, which coil is connected in parallel with the output of the second operational amplifier and the first input of the second operational amplifier, and, at a first of its ends and in conjunction with a capacitance which is connected in series with the coil inductance and the coil resistance, forms an RLC series resonant circuit; and a second coil having a second coil inductance and a second coil resistance for temperature and/or disturbance voltage compensation, which second coil is connected at a first of the ends of its coil winding to a second end of the coil winding of the first coil, and can be connected at a second of the ends of its coil winding to the second input of the first operational amplifier, the accuracy of the resonant frequency be further increased.

In a further preferred embodiment of the circuit arrangement, the first coil is a plunger-type coil with a plunger-type armature, and the RLC series resonant circuit is an active resonant circuit, whose output frequency is independent of the series resistances in the resonant circuit and is proportional to the position of the plunger-type armature in the first coil, and in which the position measurement is carried out using a resonance method based on AC voltage, such that the resonant frequency of the position measurement is significantly higher than an externally induced disturbance frequency. This advantageously results in the circuit arrangement having a highly stable response to external disturbances.

Furthermore, the plunger-type armature is preferably composed of a ferromagnetic or non-ferromagnetic material.

If the dielectric of the capacitance is composed of a temperature-stable material, and if the temperature-stable material is advantageously, for example, a COG or NP0 ceramic, the temperature response of the capacitance and therefore of the output frequency of the resonant circuit can be minimized and stabilized.

In the circuit arrangement whose resonant frequency is more accurate, a first switch is preferably provided for application of the first reference voltage to the first input of the first operational amplifier, a second switch is preferably provided for application of the second reference voltage to the first input of the first operational amplifier, and a third switch is preferably provided for amplification of a third reference voltage, and therefore of a constant difference voltage across the first coil, between the capacitance and the coil resistance of the first coil. This makes it possible to switch in a simple manner between position measurement and the additional temperature compensation since the circuit arrangement can advantageously be switched, by means of the first to third switches, between a position measurement and temperature compensation, and/or compensation for magnetic disturbance fields on the first coil.

Particularly preferably, in order to provide compensation for the measurement coil, the coil windings on the first and on the second coil form a bifilar winding with identical coil inductances, identical coil resistances, and with the coil windings connected in opposite senses, thus allowing simple detection of the temperature by evaluation of the plunger-type coil internal resistance by means of a suitable circuit, using the coil current or a voltage applied across the coil.

The output signals that are produced are therefore a digital frequency or position signal at a first output, which signal is proportional to the insertion depth of the plunger-type armature in the first coil, and/or an analog temperature signal at a second output, which signal is proportional to the temperature of the plunger-type coil, in which case this can advantageously be achieved as a function of the required characteristics and accuracies by mutually separate circuit parts or alternatively by combined circuit parts, by means of a first circuit part for the position measurement, which produces the digital frequency or position signal at the first output, and by means of a second circuit part for the resistance measurement, which produces the analog temperature signal at the second output.

On the one hand, the invention is therefore based on the idea of providing a first circuit part for the position or frequency measurement, in which a measurement coil which acts in an RLC series resonant circuit is used to measure and produce a suitable output signal, and on the other hand additionally on the use of a second circuit part, which uses a resistance measurement to allow temperature compensation and compensation for inaccuracies, induced by external magnetic disturbance fields, in the temperature compensation of the measurement coil, and which therefore allows even better measurement accuracy. Both of the abovementioned circuit parts are largely insensitive to temperature fluctuations and interference from external magnetic fields, therefore in particular reducing the sensitivity of the circuit to magnetic disturbance fields.

Other objects, advantages and novel features of the present invention will become apparent from the following detailed description when considered in conjunction with the accompanying drawings.

DETAILED DESCRIPTION

Figure 1:
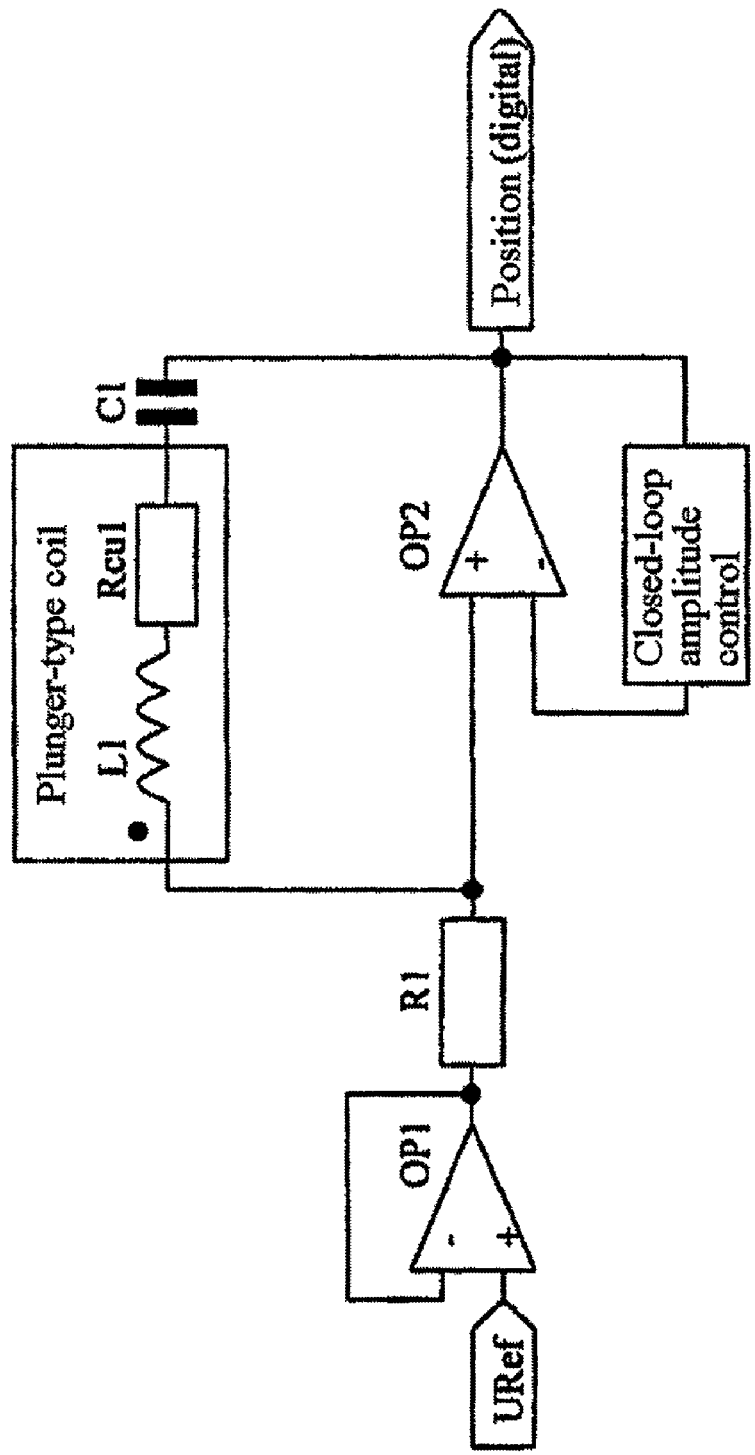
FIG. 1 is a circuit arrangement illustrating an embodiment of the present invention, showing the principle of position measurement of a sensor coil by frequency measurement, and without the coil temperature and magnetic disturbance fields being detected for compensation purposes.

In detail, FIG. 1 shows an outline circuit of the preferred position sensor system for position measurement, without the temperature or magnetic disturbance fields of the plunger-type coil or sensor coil being detected for compensation purposes, showing a first operational amplifier OP1, which is used as an inverting amplifier with its output signal being fed back to a first of its inputs (−) and to a second input (+) at which a reference voltage Uref is supplied, and whose output is connected to a resistor R1.

The output voltage from the resistor R1 is supplied to a first input (+) of a second operational amplifier OP2, whose output signal is fed back via suitable circuitry for closed-loop amplitude control to a second of its inputs (−). The closed-loop amplitude control in this case ensures that the resonant circuit oscillates reliably in every operating state, and that the oscillation frequency remains stable.

Furthermore, the sensor coil which is used for position measurement and, together with a coil inductance L1 and a coil resistance Rcu1 and an external capacitance C1, forms an RLC series resonant circuit, is furthermore connected in parallel with the operational amplifier OP2 such that the output signal from the second operational amplifier OP2 is likewise fed back to its first input (+).

The output signal from the second operational amplifier OP2 is, finally, passed out of the circuit arrangement, where it is available as a digital position signal from the sensor coil, for further processing.

FIG. 1 therefore shows a circuit arrangement which in principle comprises a (first) circuit part for position measurement by frequency measurement.

This position measurement makes use of a resonance method based on AC voltage technology, in which, in contrast to known circuit principles, an active RLC series resonant circuit is preferably used, whose output frequency is independent of the series resistances of the resonant circuit and is proportional to the position of the plunger-type armature in the coil.

The resonant frequency of the RLC series resonant circuit is in this case given by the equation:

$$f_{res} = \frac{1}{2\pi}\sqrt{LC}$$

The circuit arrangement illustrated in FIG. 1 is highly stable in response to external disturbances because of the resonance principle based on fres>>fdist, that is to say a resonant frequency fres which is very much higher than the disturbance frequency Fdist. In addition, the temperature response of the capacitance C1, that is to say the temperature dependency of the capacitance C1 can be minimized and stabilized because of the temperature dependency of the dielectric, by an appropriate choice of the capacitor material, for example with C0G or NP0 ceramic as the dielectric.

Figure 2:
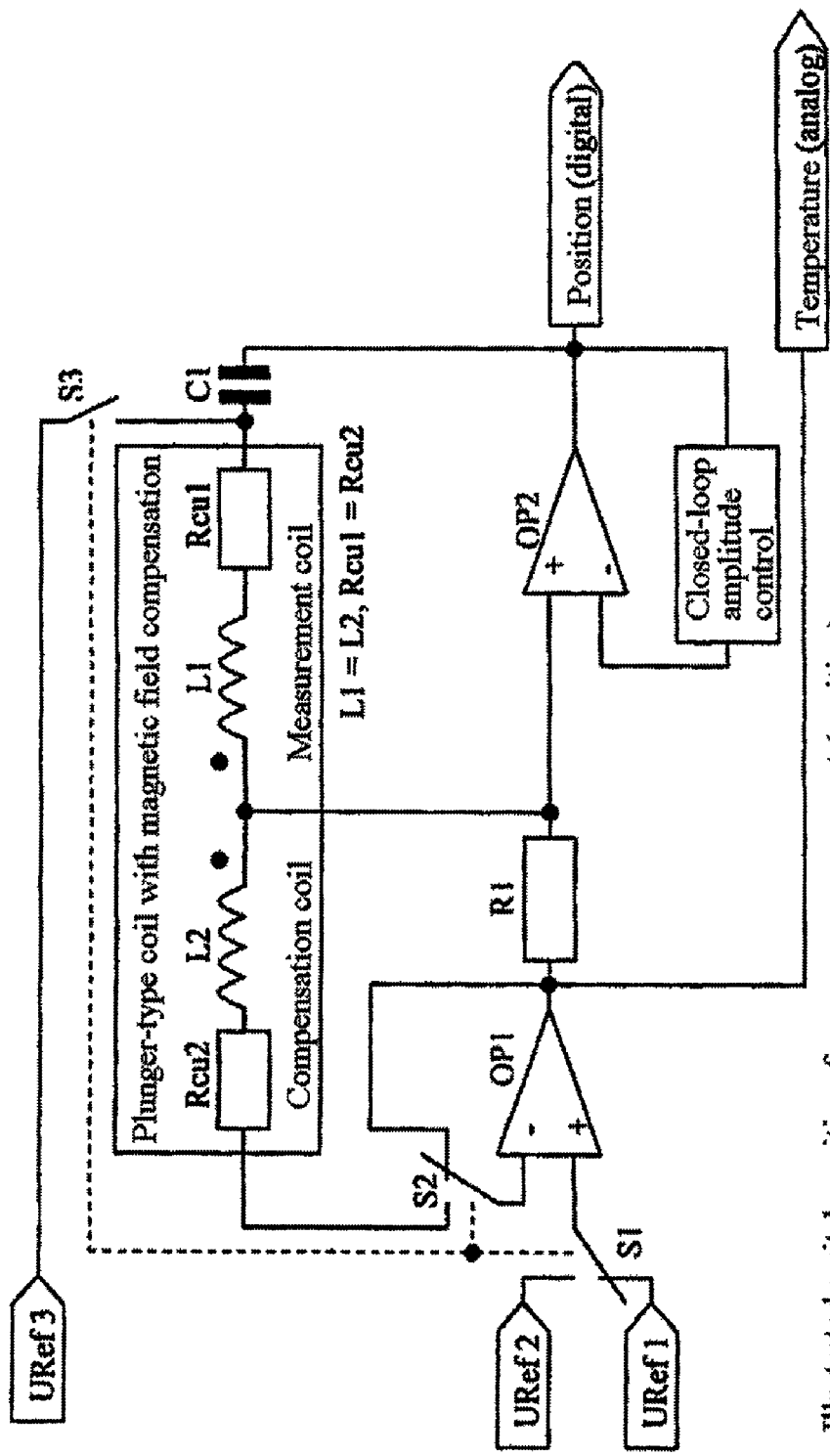
FIG. 2 is a circuit arrangement illustrating another embodiment of the present invention, showing the principle of position measurement of a sensor coil by frequency measurement, with a compensation coil for temperature compensation and compensation for magnetic disturbance fields in the sensor coil.

FIG. 2 shows a circuit arrangement based on the principle of position measurement by frequency measurement having a compensation coil for temperature compensation and compensation for magnetic disturbance fields in the plunger-type coil.

It should be noted that the circuit arrangement shown in FIG. 1 is also present in FIG. 2, so that elements which correspond to the elements in FIG. 1 will not be described once again. Furthermore, in addition to the first circuit part from FIG. 1, FIG. 2 shows a further (second) circuit part for the compensatory resistance measurement of the plunger-type coil.

In detail, this second circuit part has a first switch S1 adjacent to an input (+) of the operational amplifier OP1, by means of which a first or a second reference voltage Uref1, Uref2 can be applied to this input, a second switch S2 adjacent to the other input (−) of the operational amplifier OP1, by means of which the signal already known from FIG. 1 can be applied to this input, or a further signal, which has not yet been described, and a third switch S3, by means of which a third reference voltage Uref3 can be applied across the coil, at a node between the capacitance C1 and the coil resistance Rcu1 of the plunger-type coil.

The switches S1 to S3 are used to switch the circuit arrangement as shown in FIG. 2 can be switched between the position measurement known from FIG. 1 without resistance measurement, and the additional temperature compensation for the plunger-type coil and for compensation for magnetic disturbance fields. The position of the switches S1 to S3 illustrated in FIG. 2 indicates the switch position of these switches for the position or frequency measurement shown in FIG. 1.

The output signal from the operational amplifier OP1, according to FIG. 2, represents a temperature signal output when the switches S1 to S3 are located in their position for temperature compensation and for compensation for magnetic disturbance fields, and is available there as an analog temperature signal for further processing.

As is also shown in FIG. 2, in addition to the coil winding (measurement coil) shown in FIG. 1, the plunger-type coil has a further coil winding (compensation coil) with a coil inductance L2 and a coil resistance Rcu2, which, as will be described in the following text, is in the form of a bifilar winding and, when the switch S2 is in the switch position for compensation, is connected at one of its ends to the other input (−) of the operational amplifier OP1, while the other one of its ends is connected to one end of the winding of the measurement coil, and is therefore connected to the output of the operational amplifier OP1.

With reference to the function of resistance measurement for temperature compensation for the plunger-type coil, the accuracy of the resonant frequency fres is influenced by the material of the plunger-type armature, for example aluminum or steel, and the temperature dependency results from this of the coil inductance L1, by virtue of the plunger-type armature material with its relative permeability $\mu_r$. If this influence, which generally represents a small inaccuracy, is intolerable, compensation is carried out by determining the precise temperature of the plunger-type coil and/or of the plunger-type armature, thus further improving the overall accuracy of the circuit arrangement.

For this purpose, the temperature is preferably detected by evaluating the internal resistance R of the plunger-type coil, by determining the internal resistance R by means of a suitable circuit arrangement, using the coil current or a voltage applied across the coil. Since a measurement such as this is a DC voltage measurement and the plunger-type coil reacts to magnetic fields in its vicinity, this measurement can be greatly interfered with by a nearby magnetic alternating field and its influence on the plunger-type coil. In consequence, a bifilar winding is preferably used to compensate for the currents induced with the plunger-type coil, that is to say two exactly identical coil windings (L1=L2, Rcu1=Rcu2), of the sensor coil, resulting in compensation for the magnetic alternating field in the plunger-type coil by means of the two individual windings being connected in opposite senses, and the amplifier OP1, in the feedback path.

It should be noted that the compensation winding Rcu2/L2 would not be required for pure temperature compensation for the plunger-type coil, because it would be sufficient for this purpose to connect the central junction point between the two coils directly to the negative input of the operational amplifier OP1.

However, the compensation coil Rcu2/L2 is required to compensate for a magnetic disturbance field, because, in conjunction with the feedback path of the operational amplifier OP1, it compensates (in the opposite sense) for the alternating currents induced by the magnetic disturbance field in the plunger-type coil L1. In consequence, the alternating signal components are eliminated in the two coils and are corrected for as a disturbance source for the DC signal measurement or DC measurement of the internal resistance of the plunger-type coil.

In detail, when using compensation, a defined difference voltage (not shown) Udiff is applied across the plunger-type coil Rcu1/L1 between the switch S3 and the switch S2, so that a defined measurement current flows through the plunger-type coil. This measurement current flows through the (measurement) resistor R1 to the output pin of the operational amplifier OP1 which itself, by means of the feedback path via the coil internal resistance Rcu2 and the coil inductance L2, regulates the already mentioned difference voltage Udiff across the plunger-type coil, and keeps it constant. This closed-loop control results in the measurement current that is forced to flow through the plunger-type coil being converted across R1 to a defined voltage Utemp (not shown), which is then used as a measurement variable.

If a disturbance AC voltage were now to be present in the sensor coil during this DC voltage measurement, for example as a result of an external magnetic alternating field, this alternating-signal voltage or AC voltage would corrupt the entire measurement, and would make the measurement result unusable. The second compensation winding Rcu2/L2 is used in this situation. The transformer principle results in a further AC voltage or an alternating current being produced in this second winding which, as a result of the two windings being connected to one another and together with the operational amplifier OP1, counteracts the original disturbance voltage, and is fed with a phase shift of precisely 180° into the plunger-type coil. In consequence, the alternating signal components in the two coils cancel one another out, so as to overcome the disturbance.

It should be noted that the two measurement methods described above as well as the first and the second circuit parts can be provided both separately from one another and in combination with one another, because of the capability to use the switches S1 to S3 for switching as a function of accuracy requirements or required disturbance insensitivity to magnetic alternating fields. One preferred example of a combination such as this is illustrated in FIG. 2.

The major advantages of the preferred exemplary embodiments of the proposed circuit arrangement are therefore high accuracy and good dynamics for position measurement, good temperature stability, better disturbance immunity to magnetic disturbance fields and the capability to compensate for the temperature response of the position measurement and, in consequence, a further improved improvement in the accuracy of the measurement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

Closed-loop amplitude control
Uref1, Uref2, Uref3 Reference voltages
OP1, OP2 Operational amplifier
R1 Resistor
C1 Capacitor
L1 Coil inductance of the measurement coil
Rcu1 Coil resistance of the measurement coil
L2 Coil inductance of the compensation coil
Rcu2 Coil resistance of the compensation coil
S1, S2, S3 Switches

What is claimed is:

1. A circuit arrangement for evaluation and compensation of the signals from an inductive position sensor, comprising:
   a first operational amplifier to whose inputs a reference voltage is supplied;
   a second operational amplifier to a first of whose inputs an output signal from the first operational amplifier is supplied and to a second of whose inputs a feed-back signal is supplied for closed-loop amplitude control; and
   a coil having a coil inductance and a coil resistance for position measurement, the coil being connected in parallel with an output of the second operational amplifier and the first input of the second operational amplifier and, in conjunction with a capacitance connected in series with the coil inductance and the coil resistance, forms an RLC series resonant circuit.

2. The circuit arrangement as claimed in claim 1, wherein the first coil is a plunger-type coil with a plunger-type armature, and the RLC series resonant circuit is an active resonant circuit whose output frequency is independent of a series resistances in the resonant circuit and is proportional to a position of the plunger-type armature in the first coil, and in which a position measurement is carried out using a resonance method based on AC voltage, such that a resonant frequency of the position measurement is significantly higher than an externally induced disturbance frequency.

3. The circuit arrangement as claimed in claim 2, wherein the plunger-type armature is composed of a ferromagnetic or non-ferromagnetic material.

4. The circuit arrangement as claimed in claim 2, wherein the circuit arrangement produces a digital frequency or position signal at one of the circuit arrangement outputs, which signal is proportional to the insertion depth of the plunger-type armature in the first coil.

5. The circuit arrangement as claimed in claim 2, wherein the circuit arrangement produces a digital frequency or position signal at a first of the circuit arrangement outputs, which signal is proportional to the insertion depth of the plunger-type armature in the first coil, and produces an analog temperature signal at a second of the circuit arrangement outputs, which signal is proportional to the temperature of the plunger-type coil.

6. The circuit arrangement as claimed in claim 5, wherein a first circuit part for a position measurement produces the digital frequency or position signal at the first output, and a second circuit part for a resistance measurement produces the analog temperature signal at the second output, separately from one another or in combination.

7. The circuit arrangement as claimed in claim 1, wherein a dielectric of the capacitance is composed of a temperature-stable material.

8. The circuit arrangement as claimed in claim 7, wherein the temperature-stable material is a C0G or NP0 ceramic.

9. A circuit arrangement for evaluation and compensation of the signals from an inductive position sensor, comprising:
   a first operational amplifier to a first of whose inputs a first reference voltage is supplied for a frequency measurement or a second reference voltage is supplied for a compensation measurement, and to a second of whose inputs an output signal from the first operational amplifier or a compensation signal is supplied;
   a second operational amplifier, to a first of whose inputs the output signal from the first operational amplifier is supplied and to a second of whose inputs a feed-back signal is supplied for closed-loop amplitude control;
   a first coil having a first coil inductance and a first coil resistance for a position measurement, which coil is connected in parallel with an output of the second operational amplifier and the first input of the second operational amplifier, and, at a first of end of the first coil and in conjunction with a capacitance which is connected in series with the coil inductance and the coil resistance, forms an RLC series resonant circuit; and
   a second coil having a second coil inductance and a second coil resistance for at least one of temperature and disturbance voltage compensation, which second coil is connected at a first of end of the second coil's coil winding to a second end of a coil winding of the first coil, and is arranged to be connected at a second end of the second coil's coil winding to the second input of the first operational amplifier.

10. The circuit arrangement as claimed in claim 9, wherein the first coil is a plunger-type coil with a plunger-type armature, and the RLC series resonant circuit is an active resonant circuit whose output frequency is independent of a series resistances in the resonant circuit and is proportional to a position of the plunger-type armature in the first coil, and in which a position measurement is carried out using a resonance method based on AC voltage, such that a resonant frequency of the position measurement is significantly higher than an externally induced disturbance frequency.

11. The circuit arrangement as claimed in claim 10, wherein the plunger-type armature is composed of a ferromagnetic or non-ferromagnetic material.

12. The circuit arrangement as claimed in claim 10, wherein the circuit arrangement produces a digital frequency or position signal at one of the circuit arrangement outputs, which signal is proportional to the insertion depth of the plunger-type armature in the first coil.

13. The circuit arrangement as claimed in claim 10, wherein the circuit arrangement produces a digital frequency or position signal at a first of the circuit arrangement outputs, which signal is proportional to the insertion depth of the plunger-type armature in the first coil, and produces an analog temperature signal at a second of the circuit arrangement outputs, which signal is proportional to the temperature of the plunger-type coil.

14. The circuit arrangement as claimed in claim 13, wherein a first circuit part for a position measurement produces the digital frequency or position signal at the first output, and a second circuit part for a resistance measurement produces the analog temperature signal at the second output, separately from one another or in combination.

15. The circuit arrangement as claimed in claim 9, wherein a dielectric of the capacitance is composed of a temperature-stable material.

16. The circuit arrangement as claimed in claim 15, wherein the temperature-stable material is a C0G or NP0 ceramic.

17. The circuit arrangement as claimed in claim 9, further comprising: a first switch for application of the first reference voltage to the first input of the first operational amplifier;

a second switch for application of the second reference voltage to the first input of the first operational amplifier;

a third switch for application of a third reference voltage; and wherein a constant difference voltage is maintained across the first coil between the capacitance and the coil resistance of the first coil.

18. The circuit arrangement as claimed in claim 17, wherein the circuit arrangement is arranged to be switched by the first to third switches between at least one of a configuration for position measurement and temperature compensation, and a configuration for compensation for magnetic disturbance fields on the first coil.

19. The circuit arrangement as claimed in claim 9, wherein the coil windings on the first coil and on the second coil form a bifilar winding with identical coil inductances, identical coil resistances, and with the coil windings connected in opposite senses.

* * * * *